US008308606B2

(12) United States Patent  (10) Patent No.: US 8,308,606 B2
Müller et al. (45) Date of Patent: Nov. 13, 2012

(54) HYDRAULIC SUPPLY SYSTEM FOR A HYDRAULICALLY-ACTUATED AUTOMATIC TRANSMISSION

(75) Inventors: Eric Müller, Kaiserslautern (DE); Marco Grethel, Bühlertal (DE); Hanjo Nissen, Bühl (DE); Franz Benz, Achern (DE)

(73) Assignee: Schaeffler Technologies AG & Co. KG, Herzogenaruach (DE)

( * ) Notice: Subject to any disclaimer, the term of this patent is extended or adjusted under 35 U.S.C. 154(b) by 849 days.

(21) Appl. No.: 12/317,243

(22) Filed: Dec. 18, 2008

(65) Prior Publication Data

US 2009/0194176 A1  Aug. 6, 2009

Related U.S. Application Data

(60) Provisional application No. 61/008,022, filed on Dec. 18, 2007.

(51) Int. Cl.
*F16H 61/662* (2006.01)
*F15B 13/04* (2006.01)
*F04B 17/05* (2006.01)
*F04B 17/03* (2006.01)

(52) U.S. Cl. ............... 477/44; 137/565.11; 417/364; 417/410.1

(58) Field of Classification Search .............. 477/44; 474/8–28; 192/85.01
See application file for complete search history.

(56) References Cited

U.S. PATENT DOCUMENTS

| 6,739,305 | B2 * | 5/2004 | Takahara et al. | 123/196 R |
| 7,946,402 | B2 * | 5/2011 | Gassmann et al. | 192/85.61 |
| 2005/0235637 | A1 | 10/2005 | Müller et al. | 60/420 |
| 2008/0220917 | A1 * | 9/2008 | Grethel et al. | 474/28 |
| 2008/0256942 | A1 | 10/2008 | Müller et al. | 60/430 |
| 2008/0277239 | A1 * | 11/2008 | Gassmann et al. | 192/85 R |

FOREIGN PATENT DOCUMENTS

EP 1 253 353 A1 10/2002
WO WO 03/087627 A1 10/2003

* cited by examiner

*Primary Examiner* — Michael R Mansen
*Assistant Examiner* — Robert T Reese
(74) *Attorney, Agent, or Firm* — Alfred J. Mangels

(57) ABSTRACT

A hydraulic supply system for a hydraulically-operated automatic transmission includes a primary pump that is driven by an internal combustion engine of a vehicle. An electrically-driven auxiliary pump is provided to supply the system with hydraulic pressure when the primary pump is off or to supplement the primary pump when the primary pump does not deliver sufficient pressure. A discharge line from the auxiliary pump is connected to a control line of the hydraulic supply system and to the hydraulic system supply line under system pressure. Check valves are provided in the respective lines from the auxiliary pump. An additional check valve is provided in a line that extends from the control line to a torque sensing chamber of the automatic transmission.

7 Claims, 2 Drawing Sheets

HYDRAULIC SUPPLY SYSTEM FOR A HYDRAULICALLY-ACTUATED AUTOMATIC TRANSMISSION

BACKGROUND OF THE INVENTION

1. Field of the Invention

The present invention relates to a hydraulic supply system for a hydraulically-actuated automatic transmission.

2. Description of the Related Art

FIG. 2 shows a longitudinal cross section of a conical disk pair subassembly of a known belt-driven conical pulley transmission. The conical pulley subassembly includes a shaft 10, to which an axially fixed disk 12 is rigidly connected. Situated on shaft 10 and axially movable along a splined connection but non-rotatably carried by the shaft 10 is an axially movable disk 16. Conical surfaces of disks 12 and 16 face each other, between which an endless torque-transmitting means (not shown) circulates, which connects the illustrated conical disk pair with another conical disk pair (not shown) of the belt-driven conical-pulley transmission.

In a radially outer area of axially movable disk 16, on its side facing away from the conical surface, an annular cylinder 18 having two radially spaced, axially-extending walls defining a U-shaped cross section is rigidly attached. On the radially inner side of annular cylinder 18 a guide ring component 20 formed with a guide surface is rigidly attached.

Rigidly connected to shaft 10 at a distance from axially movable disk 16 is a support ring component 22, which includes a first axially-extending annular projection 24 that is designed on its free face with circumferentially distributed first ramp surfaces 26. Radially outwardly of the first annular projection 24, support ring component 22 includes a second axially-extending annular projection 28 that extends between the walls of annular cylinder 18. Second annular projection 28 is movable within annular cylinder 18 and includes seals, so that an adjusting chamber 30 is formed between second projection 28 and annular cylinder 18, which chamber is chargeable with hydraulic fluid through radial bores 32 in axially movable disk 16 and shaft 10, as well as a supply bore 34 extending within shaft 10.

Between support ring component 22 and axially movable disk 16, an annular sensing piston 36 is guided on shaft 10 so that it can move axially. Sensing piston 36 is generally cup-shaped, having an opening that faces in the direction of axially movable disk 16 and that ends in a ring 38, on whose side facing away from axially movable disk 16 two circumferentially spaced ramp surfaces 40 are formed. Between the first ramp surfaces 26 and the second ramp surfaces 40 rolling elements 42 are situated, which extend through cutouts formed in the sensing piston 36. The axial position of rolling elements is determined primarily by ramp surfaces 26, 40 and the radial position is determined primarily by guide surfaces 43 formed on guide ring component 20, coordinated with the ramp surfaces, as well as a radially outer surface of an axial extension of axially movable disk 16.

Between sensing piston 36 and axially movable disk 16 a torque sensing chamber 44 is formed, which is connected via radial feeder bores 46 formed in shaft 10 to a supply bore 48 extending through the shaft. Radial discharge bores 50 extend from torque sensing chamber 44 into a discharge bore 52 formed within the shaft.

On its side facing away from axially movable disk 16, sensing piston 36 has axially extending arms 54 that are situated at uniform intervals around the circumference. Arms 54 extend through openings formed in support ring component 22 and are formed with outer teeth 56 that mesh with inner teeth 58 of a drive gear 60, which is supported on shaft 10 and through which the transmission is driven. Sensing piston 36 is thus connected to drive gear 60, rigidly in the circumferential direction and is axially movable relative to the latter.

The construction and function of the conical pulley subassemblies described by way of example are known, and therefore will not be explained in detail. In consequence of rotation of sensing piston 36 relative to the support ring component 22, the axial position of sensing piston 36 changes as a result of corresponding shaping of ramp surfaces 26, 40, and of guide surfaces 43, and in such a way that when torque is high the sensing piston increasingly closes a discharge opening 61 from which radial discharge bore 50 extends, so that the hydraulic pressure in torque sensing chamber 44 increases, and axially movable disk 16 is subjected to a torque-dependent pressure in the direction toward fixed disk 12. The shift of axially movable disk 16 that is necessary to change the transmission ratio is accomplished by changing the pressure in adjusting chamber 30.

When the transmission is used in a motor vehicle, the delivery of hydraulic pressure to adjusting chamber 30 and to torque sensing chamber 44 is normally accomplished by a hydraulic pump that is driven by an internal combustion engine that serves to propel the vehicle. In order to reduce fuel consumption and improve environmental friendliness, modern motor vehicles are equipped with stop-start systems in which the internal combustion engine is automatically shut down in operating phases in which it is not needed for propelling the vehicle, for example when decelerating, when stopped at a traffic signal, or in stop-and-go traffic. The problem arises here that the supply of hydraulic pressure or hydraulic fluid to the belt-driven conical-pulley transmission is not ensured when the internal combustion engine or the pump is stopped, since when the pump is stopped the pressure in the adjusting chamber and the torque sensing chamber drops off rapidly due to leakage losses, or because hydraulic fluid drains from the adjusting chamber. The transmission is then no longer operable when the vehicle is to resume motion. Upon restarting the pump or the internal combustion engine, a certain period of time passes before the transmission is again supplied acceptably with hydraulic fluid; that can lead to dangerous situations, and during that time the transmission can be damaged by insufficient contact pressure against the endless torque-transmitting means.

An object of the present invention is to provide a remedy for the above-identified problems.

SUMMARY OF THE INVENTION

Briefly stated, in accordance with one aspect of the present invention, a hydraulic supply system is provided for a hydraulically-operated automatic transmission, especially a belt-driven conical pulley transmission. The transmission includes two conical disc pairs that are operatively connected with each other by an endless torque transmitting means. The hydraulic system includes a primary pump for providing hydraulic pressure in a supply line that is connected via a transmission ratio adjusting valve to at least one adjusting chamber of the transmission, and is connected to at least one connecting line that is connected to at least one sensing chamber to which hydraulic fluid flows. The flow cross-section available to the flow through the sensing chamber depends upon the torque transmitted by the transmission, and is connected via a pilot valve to a control line in which a control valve is located by means of which the pressure in the control line determining the position of the transmission ratio adjusting valve is adjustable. An auxiliary pump is driven by an auxiliary drive that is separate from the primary pump drive, and the discharge line of the auxiliary pump is connected with the control line and with the supply line by means of a branch line branching from the discharge line. In the discharge line upstream from the branching of the branch line, there is a first check valve opening toward the control line. A second check valve is provided in the branch line opening toward the supply line, and a line leading from the connecting line to the control line includes a third check valve that opens toward the control line.

The hydraulic system in accordance with the present invention is suitable for use in nearly all types of hydraulically-operated automatic transmissions, and it can also be used quite generally for hydraulically operated devices.

The pilot valve is preferably designed so that the pressure in the control line does not rise above a predetermined pressure value. To limit the pressure in the control line, the pilot valve includes a return line that is connected to the control line when the pressure in the control line rises above the predetermined pressure value.

An orifice plate can be positioned in the line running from the connecting line to the control line.

The supply line is connected to the connecting line by a connecting valve that includes a control chamber that is connected to the supply line, and that opens the connection between the supply line and connecting line above a predetermined pressure in the control chamber.

The primary pump provided for the normal supply of the hydraulic supply system is advantageously driven by an internal combustion engine for driving a vehicle. The auxiliary pump is advantageously driven by an electric motor that is energized when the internal combustion engine is off.

The invention can also be utilized in vehicles having a hybrid drive system.

BRIEF DESCRIPTION OF THE DRAWINGS

The structure, operation, and advantages of the present invention will become further apparent upon consideration of the following description, taken in conjunction with the accompanying drawings in which.

DESCRIPTION OF THE PREFERRED EMBODIMENTS

Figure 1:
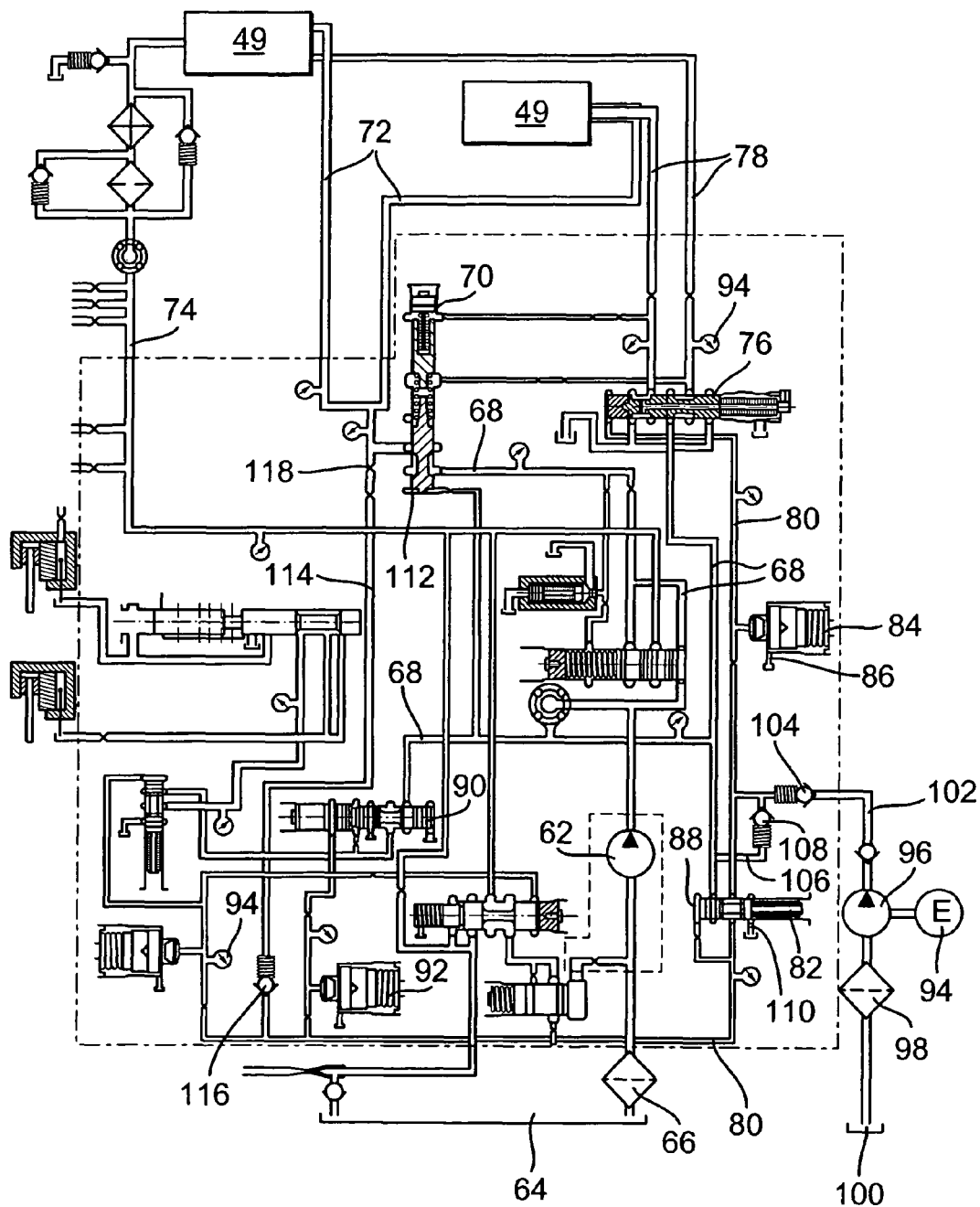
FIG. 1 is a block diagram of parts of a hydraulic supply system in accordance with the present invention for a belt-driven conical pulley transmission.
Figure 2:
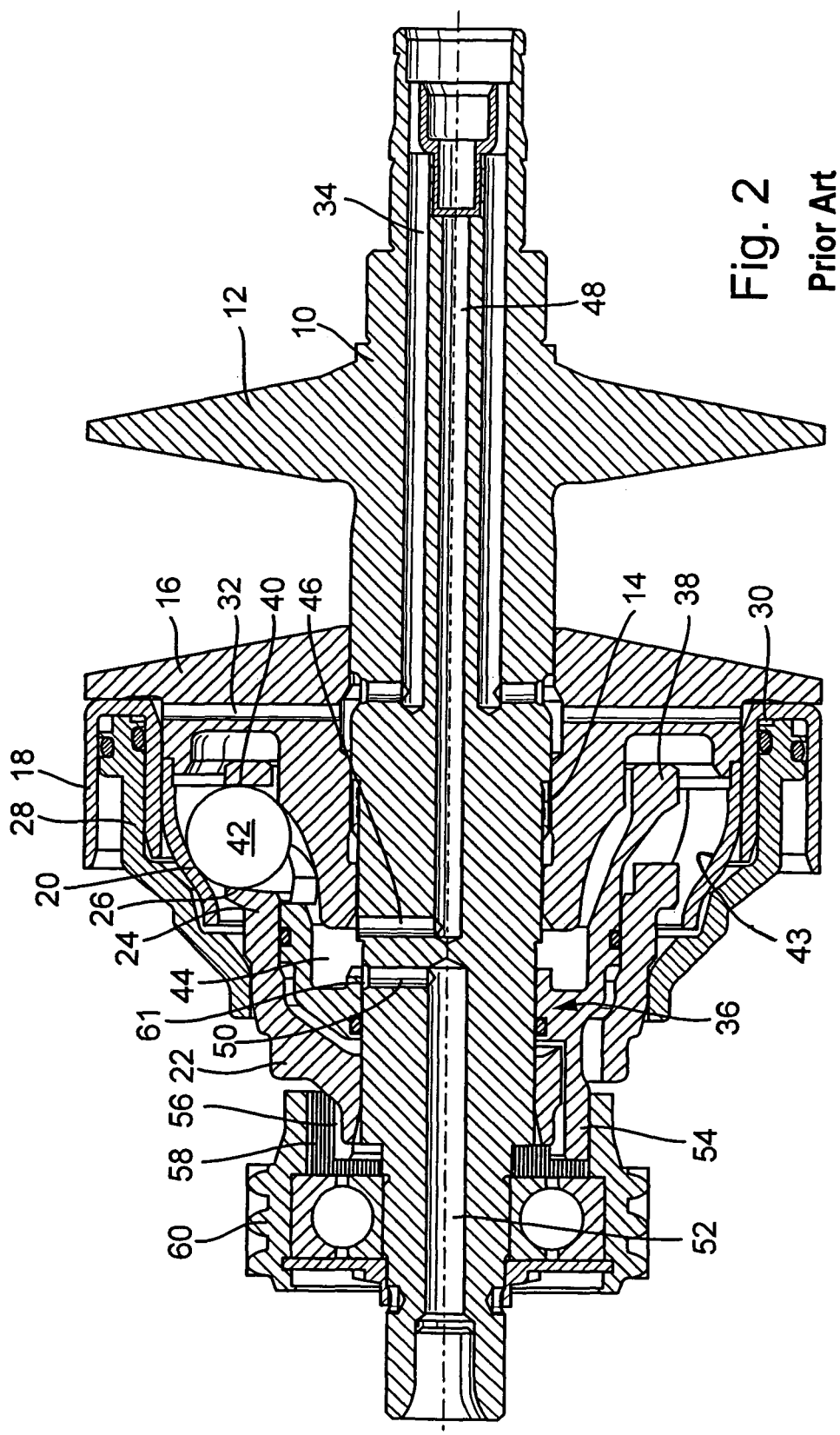
FIG. 2 a longitudinal cross section of a known conical disc pair assembly.

As shown in FIG. 1, a hydraulic system for supplying a belt-driven conical pulley transmission includes a primary pump 62 driven by an internal combustion engine (not shown) that draws hydraulic fluid from a reservoir 64 through a filter 66 and produces a system pressure in a supply line 68. The supply line 68 extends through a connecting valve 70 to connecting lines 72 which are connected to respective ones of the supply bores 48 (FIG. 2) of each conical disc pair assembly 49, by means of which a torque-dependent pressure is produced on the endless-torque transmitting means. A return line 74 is connected to the discharge bore 52. In addition, the supply line 68 extends through a transmission ratio adjusting valve 76 to lines 78, each of which is connected to a supply bore 34 of a respective conical disc assembly 49 through which the adjusting chamber 30 (FIG. 2) is supplied with pressure.

The transmission ratio adjusting valve 76 is controlled by a control line 80 that is connected to the supply line 68 via a pilot valve 82. An electrically controlled control valve 84, designed as a proportional valve, is located in control line 80 and connects the control line with the return line 86 when control valve 84 is completely open. The position of the pilot valve 82 is substantially determined by the pressure that exists in its pilot chamber 88 and the pressure that is present in the control line 80.

The supply line 68 continues to a clutch valve 90 that supplies hydraulic pressure to clutches in the belt-driven conical pulley transmission for forward and reverse travel, as well as to a selector lever valve. An electrically-controlled clutch control valve is identified by reference numeral 92.

The construction and function of the above-described hydraulic supply system is known per se and will therefore not be described in further detail. The electrically controlled control valves 84 and 92, as well as additional control valves, are controlled by an electronic control unit (not shown) in accordance with predetermined programs, wherein the values of operating parameters of the drive train that are essential for operating the belt-driven conical pulley transmission are at inputs of the electronic control device. The operating parameters include, for example, the position of a gas pedal, vehicle speed, RPM of the internal combustion engine, etc. The pressures existing at different positions of the hydraulic system are detected by means of pressure sensors (not all of which that are shown in FIG. 1 have a reference numeral). The sensed pressures are used for monitoring the operation and for control.

To ensure that the belt-driven conical pulley transmission is supplied with hydraulic fluid even when the primary pump 62 is not being driven or is off, an auxiliary pump 96 driven by an electric motor 94 is provided and draws hydraulic fluid through a filter 98 from a reservoir 100 and conveys it to a discharge line 102. Of course, reservoir 100 can be identical with reservoir 64, and filter 98 can be identical with filter 66.

The discharge line 102 terminates in the control line 80 and contains a first check valve 104 that opens toward the control line 80. A branch line 106 branches off from the discharge line 102 between the first check valve 104 and control line 80. Branch line 106 terminates in the supply line 68 and contains a second check valve 108 that opens toward the supply line.

The pilot valve 82 includes a return line 110 and is designed such that the supply line 68 is connected to the control line 80 when the pilot chamber 88 is not pressurized. The supply line 68 is disconnected from the control line 80 at a predetermined pressure in the pilot chamber 88, and as the pressure in the pilot chamber 88 or in the control line 80 continues to increase, the control line is increasingly connected to the return line 110 so that hydraulic fluid flows out through the return line 110.

The connecting valve 70 includes a control chamber 112 that is connected to the supply line 68. If a predetermined pressure in the control chamber 112 is exceeded, a valve spool of the connecting valve 70 is shifted to establish a connection between the supply line 68 and the connecting lines 72

A line 114 extends from the connecting lines 72 to the control line 80. A third check valve 116 is located in the line 114 before it terminates in the control line 80, and it opens toward the connecting lines 72. Further in the direction of flow before connecting to connecting valve 70, line 114 contains at least one orifice plate 118 (in the illustrated example two sequential orifices are shown).

The described system functions as follows:

In the normal mode, i.e., when the internal combustion engine is running, the primary pump 62 operates and builds pressure in the supply line 68 and in the control line 80 via the pilot valve 82 that is at first open when the primary pump 62 starts. The pressure in the control line 80 is limited to a value determined by the fact that the pilot valve 82 disconnects the connection between the supply line 68 and control line 80 at the predetermined pressure in the pilot chamber 88. The check valves 104 and 108 prevent hydraulic fluid from flowing through the discharge line 102 and through auxiliary pump 96.

The connecting valve 70 opens the connection between the supply line 68 and the connecting lines 72 once a predetermined pressure that is preferably slightly above the pressure in the control line 80 is exceeded in its control chamber 112. The hydraulic fluid that flows from the connecting valve 70 through the connecting lines 72 into and through the sensing chambers cannot flow back into the control line 80 because of the third check valve 116.

If the primary pump 62 is stopped in a start/stop mode of the internal combustion engine, the system's hydraulic fluid supply stops, and the supply line 68 and control line 80 are depressurized due to loss from leakage, etc. Hence the system is not immediately functional when the internal combustion engine or primary pump 62 restarts, and a certain amount of time is required for the pressure to build up. Within that period, the vehicle is not operable, and the transmission can become damaged because of an absence of pressure between the conical discs and the endless-torque transmitting means.

Once the primary pump 62 stops or while starting the stopped vehicle without starting the internal combustion engine, the electric motor 94 starts and activates the auxiliary pump 96. The first check valve 104 and second check valve 108 open to build up pressure in the control line 80 and supply line 68, even when there is a slight pressure in the discharge line 102. Once a predetermined pressure is achieved in the control line 80, the third check valve 116 opens to supply the torque sensing chamber 44 (see FIG. 2) with hydraulic fluid delivered by the auxiliary pump 96 through the connecting lines 72. If that hydraulic fluid cannot drain through the discharge bore 50 (see FIG. 2) leading from the torque sensing chamber 44, the pressure in the system continues to increase, which switches the pilot valve 82 into a functional state in which excess hydraulic fluid flows out of the return line 110. That simultaneously limits the system pressure that exists in the supply line 68. When the auxiliary pump 96 operates, the hydraulic system thus becomes fully functional, and driving can commence immediately.

The system is therefore not restricted to start/stop mode because it is fully functional when the primary pump 62 starts. Rather, the system can also be used in a hybrid drive, for example, in which the internal combustion engine and hence the primary pump 62 are turned off while driving the vehicle, and thus pressurized hydraulic fluid is supplied via the auxiliary pump 96 while driving.

The auxiliary pump 96 can also be used to supplement primary pump 62 when the pressure in the supply line 68 drops in critical driving situations when, for example, the amount of hydraulic fluid flowing out of the torque sensing chamber is not sufficiently replenished by the primary pump 62. Starting the auxiliary pump 96 causes the pressure in the control line 80 to quickly rise, so that the pilot valve 82 disconnects the control line 80 from the supply line 68. The primary pump 62 then no longer conveys hydraulic fluid to the control line 80 so that the entire delivered volume is available for the supply line 68.

Using the auxiliary pump 96 to supplement the primary pump 62 allows the primary pump 62 to be designed smaller, which favorably influences the overall effectiveness of the system.

If the existing pressure in the torque sensing chamber 44 (FIG. 2) plus the pilot pressure from the third check valve 116 is lower than the pressure in the control line 80, hydraulic fluid is additionally delivered through the third check valve 116 into the torque sensing chamber 44. To prevent the pressure in the control line 80 from collapsing, at least one orifice plate 118 limits the volume flowing toward the torque sensing chamber.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. A hydraulic supply system for a hydraulically-operated, belt-driven conical pulley transmission having two conical disc pairs connected with each other by an endless torque transmitting means, said hydraulic system comprising: a primary pump that is driven by a primary pump drive for providing hydraulic pressure in a supply line that is connected via a transmission ratio adjusting valve to at least one adjusting chamber associated with at least one conical disk pair; at least one connecting line connected to at least one torque sensing chamber associated with the at least one conical disk pair and through which pressurized hydraulic fluid flows, wherein an outlet flow cross-sectional area available to the pressurized hydraulic fluid that flows through the torque sensing chamber is a function of a torque transmitted to the transmission; a pilot valve connected between the supply line and a control line in which a control valve is located and by which control valve a pressure in the control line that determines a position of the transmission ratio adjusting valve is adjusted; an auxiliary pump driven by an auxiliary pump drive that is separate from the primary pump drive, wherein the auxiliary pump has a unitary discharge line connected with the control line and wherein the unitary discharge line is connected with the supply line by a branch line branching from the auxiliary pump unitary discharge line, wherein, in the auxiliary pump unitary discharge line upstream from the connection of the unitary discharge line with the branch line a first check valve is provided that opens toward the control line; a second check valve is provided in the branch line and opens toward the supply line; wherein a line leading from the at least one connecting line to the control line includes a third check valve that opens toward the at least one connecting line; and wherein the auxiliary pump is operative when the hydraulic pressure provided by the primary pump is inadequate to maintain hydraulic pressure in the supply line.

2. A hydraulic supply system in accordance with claim 1, wherein the pilot valve limits the pressure in the control line so that it does not exceed a predetermined pressure value.

3. A hydraulic supply system in accordance with claim 2, wherein the pilot valve includes a return line that is connected to the control line and to a hydraulic fluid reservoir when the pressure in the control line rises above the predetermined pressure value.

4. A hydraulic supply system in accordance with claim 1, including a flow restriction located in the line extending from the connecting line to the control line to limit the flow of hydraulic fluid from the control line to the at least one connecting line.

5. A hydraulic supply system in accordance with claim 4, wherein the flow restriction is an orifice plate.

6. A hydraulic supply system in accordance with claim 1, wherein the supply line is connected to the at least one connecting line by a connecting valve that includes a control chamber connected to the supply line, and wherein the connecting valve opens a connection between the supply line and the at least one connecting line when a predetermined pressure in the control chamber is exceeded.

7. A hydraulic supply system in accordance with claim 1, wherein the primary pump is driven by an internal combustion engine of a motor vehicle, and the auxiliary pump is driven by an electric motor that is energized when the internal combustion engine is not providing drive power to the primary pump, and is energized when there is insufficient pressure in at least one of the supply line and the control line.

* * * * *